US012350910B2

(12) United States Patent
Suzuki et al.

(10) Patent No.: US 12,350,910 B2
(45) Date of Patent: Jul. 8, 2025

(54) MULTILAYERED POLYESTER FILM

(71) Applicant: TORAY INDUSTRIES, INC., Tokyo (JP)

(72) Inventors: Tadamasa Suzuki, Otsu (JP); Sho Tsubokura, Otsu (JP); Takuji Higashioji, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 310 days.

(21) Appl. No.: 17/919,399

(22) PCT Filed: May 7, 2021

(86) PCT No.: PCT/JP2021/017428
§ 371 (c)(1),
(2) Date: Oct. 17, 2022

(87) PCT Pub. No.: WO2021/241159
PCT Pub. Date: Dec. 2, 2021

(65) Prior Publication Data
US 2023/0150250 A1 May 18, 2023

(30) Foreign Application Priority Data
May 29, 2020 (JP) ................................ 2020-094337

(51) Int. Cl.
| B32B 27/36 | (2006.01) |
| B29B 17/00 | (2006.01) |
| B32B 7/02 | (2019.01) |
| B32B 7/06 | (2019.01) |
| B32B 18/00 | (2006.01) |
| B32B 27/08 | (2006.01) |
| B32B 27/28 | (2006.01) |
| B32B 27/30 | (2006.01) |
| B32B 37/26 | (2006.01) |
| C04B 35/468 | (2006.01) |
| C04B 35/622 | (2006.01) |

(52) U.S. Cl.
CPC ................ *B32B 27/36* (2013.01); *B32B 7/02* (2013.01); *B32B 7/06* (2013.01); *B32B 18/00* (2013.01); *B32B 27/283* (2013.01); *B29B 17/00* (2013.01); *B32B 27/08* (2013.01); *B32B 27/306* (2013.01); *B32B 2037/268* (2013.01); *B32B 2255/10* (2013.01); *B32B 2255/20* (2013.01); *B32B 2255/26* (2013.01); *B32B 2255/28* (2013.01); *B32B 2307/538* (2013.01); *B32B 2329/04* (2013.01); *B32B 2367/00* (2013.01); *B32B 2383/00* (2013.01); *B32B 2457/16* (2013.01); *C04B 35/468* (2013.01); *C04B 35/622* (2013.01); *Y02W 30/62* (2015.05); *Y10T 428/31786* (2015.04); *Y10T 428/31797* (2015.04)

(58) Field of Classification Search
None
See application file for complete search history.

(56) References Cited

U.S. PATENT DOCUMENTS

| 5,055,139 A | * | 10/1991 | Personette | ............... C11D 7/06 510/435 |
| 5,508,358 A | * | 4/1996 | Ono | ..................... C09D 183/10 525/464 |
| 2005/0287380 A1 | * | 12/2005 | Klein | ...................... C08J 7/043 525/425 |
| 2008/0063857 A1 | * | 3/2008 | Konrad | ................... B65D 31/02 427/407.1 |
| 2009/0084487 A1 | * | 4/2009 | Lijima | .................... B28B 5/027 156/89.12 |
| 2010/0080986 A1 | * | 4/2010 | Lijima | ................. C04B 35/4682 156/89.12 |
| 2011/0287244 A1 | * | 11/2011 | Murayama | ........... C09D 5/1668 428/480 |
| 2019/0160728 A1 | * | 5/2019 | Higashioji | ............... B29D 7/01 |
| 2020/0291271 A1 | * | 9/2020 | Miyamoto | ............. B32B 27/32 |
| 2024/0101772 A1 | * | 3/2024 | Yahiro | ..................... C08J 7/042 |

FOREIGN PATENT DOCUMENTS

| JP | 9-239828 A | | 9/1997 |
| JP | 2005-131552 A | | 5/2005 |
| JP | 2005-262456 A | * | 9/2005 |
| JP | 2006-334966 A | | 12/2006 |
| JP | 2013-63610 A | | 4/2013 |
| JP | 2014-226922 A | | 12/2014 |
| JP | 2019-196005 A | | 11/2019 |
| WO | WO 2017/221701 A | * | 12/2017 |

OTHER PUBLICATIONS

International Search Report, issued in PCT/JP2021/017428, PCT/ISA/210, dated Jul. 20, 2021.
Written Opinion of the International Searching Authority, issued in PCT/JP2021/017428, PCT/ISA/237, dated Jul. 20, 2021.

* cited by examiner

*Primary Examiner* — Vivian Chen
(74) *Attorney, Agent, or Firm* — Birch, Stewart, Kolasch & Birch, LLP

(57) ABSTRACT

A multilayered polyester film which comprises a polyester film and, disposed on at least one surface thereof, a layer X which has a contact angel HX(1) with water of 0-60°, wherein the layer X has a degree of crystallinity C(0) of 0-30%. HX(1): Contact angle at one second after water has come into contact with layer X. A polyester film having excellent recoverability is provided by disposing a layer X on at least one surface of a polyester film, the layer X having a regulated contact angle with water and a regulated degree of crystallinity.

6 Claims, No Drawings

MULTILAYERED POLYESTER FILM

TECHNICAL FIELD

The present invention relates to a multilayered polyester film excellent in removing a layer provided on the multilayered polyester film.

BACKGROUND ART

Plastics are utilized in a variety of fields. On the other hand, the plastics are considered to be a cause of marine pollution such as microplastics, and thus it is urgent to reduce the environmental load caused by plastics. In recent years, with the evolution of IoT (Internet of Things), electronic devices such as CPUs mounted on computers and smartphones have rapidly increased. Accordingly, the number of multilayered ceramic capacitors (MLCC), which are important for driving electronic devices, has been also explosively increasing. A general method for producing an MLCC includes the following steps. This is a step of multilayering a ceramic green sheet and an electrode on a release film having a plastic film as a substrate and a release layer provided on the substrate, and then peeling the multilayered body from the release film, and a step of multilayering a plurality of layers of the multilayered body obtained in this step and firing the multilayered body. In the above steps, the release film is discarded as an unnecessary substance during the steps.

That is, the load on the environment due to the increase in the number of release films discarded as unnecessary materials due to the explosive increase in the number of MLCCs in recent years is becoming a problem. The components of the release layer contained in the release film used in a producing process of MLCC are generally different in composition from the components constituting the film from the viewpoint of releasability. Therefore, when the release film to which the release layer is attached is directly remelted, the component of the release layer exists as a foreign substance, and thus cannot be reused.

Patent Document 1 discloses a technique in which a wax is kneaded into a film and used as a release film without providing a release layer. Patent Document 2 discloses a method in which a release film having a release layer is cleaned using a metal brush, and the film from which the release layer has been removed is reused. Patent Document 3 discloses a method in which a water-soluble resin layer is provided between a release layer and a polyester film, and the release layer is removed by washing with water, and then reused.

PRIOR ART DOCUMENTS

Patent Documents

Patent Document 1: International Publication No. 2013-15260
Patent Document 2: Japanese Patent Laid-open Publication No. 2012-171276
Patent Document 3: Japanese Patent No. 4284936

SUMMARY OF THE INVENTION

Problems to be Solved by the Invention

However, when the wax is used as the release agent, the coatability of the ceramic slurry which is the material of the ceramic green sheet and the releasability of the green sheet obtained by drying the ceramic slurry are not sufficient. In addition, since the wax is a substance different from the component constituting the film, there is a problem that the wax becomes a foreign substance when re-melted and reused. In addition, when the release film is cleaned using a metal brush, there are problems that the release film cannot be uniformly cleaned or the removability of the release layer is not sufficient. In addition, a method for providing a water-soluble resin layer between the release layer and the polyester film also has a problem that the removability is not sufficient.

Solutions to the Problems

In order to solve the above-described problems, the present invention has the following constitution. That is,

[I] A multilayered polyester film which includes a polyester film and, disposed on at least one surface of the polyester film, a layer X which has a water contact angle HX(1) of 0° or higher and 60° or lower, wherein the layer X has a degree of crystallinity C(0) of 0% or more and 30% or less.

HX(1): Contact angle at one second after water has come into contact with layer X

[II] The multilayered polyester film according to [I], in which the degree of crystallinity C (150) of the layer X after a heat treatment at 150° C. for 30 minutes is 0% or more and 30% or less.

[III] The multilayered polyester film according to [I] or [II], in which a ratio Ra/Xt of a surface roughness Ra (nm) of the polyester film on a side where the layer X is provided to a thickness Xt (nm) of the layer X is 0.001 or more and 1.0 or less.

[IV] The multilayered polyester film according to any one of [I] to [III], in which the layer X contains a resin having polyvinyl alcohol as a main chain structure.

[V] The multilayered polyester film according to any one of [I] to [IV], further including a layer Y having a water contact angle HY (1) of 80° or higher and 120° or lower on a surface of the layer X opposite to a surface in contact with the polyester film, wherein the water contact angles HY (1))(°) and HY (20))(°) of the layer Y of the film satisfy the following formula:

$$45 \leq |HY(1) - HY(20)| \leq 80$$

HY(1): Contact angle at one second after water has come into contact with layer Y
HY(20): Contact angle at 20 seconds after water has come into contact with layer Y

[VI] The multilayered polyester film according to [V], in which the layer Y contains a resin having dimethylsiloxane as a main chain structure.

[VII] The multilayered polyester film according to [V] or [VI], in which a layer to be released is provided on a surface of the layer Y opposite to a surface in contact with the layer X, and the multilayered polyester film is used for release applications in which the layer to be released is released from the layer Y.

[VIII] The multilayered polyester film according to [V] or [VI], in which a layer to be released is provided on a surface of the layer Y opposite to a surface in contact with the layer X, and the multilayered polyester film is used for applications in which the layer X and the layer Y are removed after the layer to be released is released from the layer Y.

[IX] The multilayered polyester film according to [V] or [VI], in which a layer to be released is provided on a surface of the layer Y opposite to a surface in contact with the layer X, and the multilayered polyester film is used for reuse of a polyester film obtained by peeling off the layer to be released from the layer Y and then further removing the layer X and the layer Y.

[X] The multilayered polyester film according to any one of [VII] to [IX], in which the layer to be released is a ceramic green sheet containing barium titanate as a main component.

[XI] The multilayered polyester film according to any one of [I] to [X], which is used as a release film in a multilayer ceramic capacitor (MLCC) producing process.

[XII] A multilayered polyester film including a polyester film and a layer Y, wherein water contact angles HY (1))(°) and HY (20))(°) in the layer Y satisfy the following formulas:

$$70 \leq HY(1) \leq 120, 10 \leq |HY(1)-HY(20)| \leq 80$$

HY(1): Contact angle at one second after water has come into contact with layer Y HY(20): Contact angle at 20 seconds after water has come into contact with layer Y Effects of the Invention After the multilayered polyester film of the present invention is used for industrial applications such as adhesive tapes and substrates for release films, a multilayered polyester film having excellent removability of layers other than the polyester film can be provided.

EMBODIMENTS OF THE INVENTION

Hereinafter, the present invention will be described in detail with reference to specific examples.

The present invention relates to a multilayered polyester film in which one or more layers are provided on at least one side of a polyester film. In addition, the polyester mentioned in the present invention is one having a dicarboxylic acid constituent component and a diol constituent component. It is noted here that the term "constituent component" used herein refers to the smallest unit that can be obtained by hydrolysis of polyester. Examples of the dicarboxylic acid constituent component constituting the polyester include aromatic dicarboxylic acids such as terephthalic acid, isophthalic acid, phthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyldicarboxylic acid, and 4,4'-diphenyl ether dicarboxylic acid, and ester derivatives thereof.

Examples of the diol constituent component that constitutes the polyester include diols including aliphatic diols such as ethylene glycol, 1,2-propanediol, 1,3-propanediol, 1,4-butanediol, 1,2-butanediol, and 1,3-butanediol, alicyclic diols such as cyclohexanedimethanol and spiroglycol, and a series of two or more of the above-described diols are linked. Among them, polyethylene terephthalate (PET), polyethylene-2,6-naphthalenedicarboxylate (PEN), polyester obtained by copolymerizing isophthalic acid or naphthalenedicarboxylic acid with a part of a dicarboxylic acid component of PET, and polyester obtained by copolymerizing cyclohexanedimethanol, spiroglycol, or diethylene glycol with a part of a diol component of PET are preferably used from the viewpoint of mechanical properties and transparency.

The multilayered polyester film of the present invention needs to have a layer X having a water contact angle HX (1) of 0° or higher and 60° or lower on at least one surface of the polyester film. When the water contact angle of the layer X is measured by the method described later, HX (1) referred to herein represents the contact angle after one second from the contact of water with the layer X. By setting the water contact angle of the layer X within this range, the layer X easily absorbs water, and the layer X can be removed from the multilayered polyester film by washing with water. The contact angle is not substantially lower than 0°. In addition, when the contact angle higher than 60°, the water absorbability of the layer X is poor. HX (1) is more preferably 10° or higher and 45° or lower.

When the contact angle after 20 seconds from the contact of water with the layer X is defined as HX(20), setting the absolute value of the difference between HX(20) and HX(1) (|HX(20)−HX(1|) H to 5° or higher, preferably 10° or higher and 30° or lower improves the water absorbency of the layer X and facilitates washing with water.

The layer X of the multilayered polyester film of the present invention needs to have a degree of crystallinity C (0) of 0% or more and 30% or less. The degree of crystallinity generally represents the degree of crystallization of a substance, and as the degree of crystallinity is higher, the substance contains more crystal moieties that are stable in terms of free energy. That is, as the degree of crystallinity is higher, the substance itself becomes more stable, and for example, the elutability with respect to water may decrease. The degree of crystallinity of the layer X is not substantially less than 0%, and when the crystallinity exceeds 30%, durability against water is improved, and the layer X may not be easily removed using water. When C (0) is less than 1.0%, it may be difficult to form the layer X on the polyester film. Therefore, C (0) is more preferably 1.0% or more and 20% or less, and still more preferably 1.0% or more and 10% or less.

The degree of crystallinity C (150) of the layer X of the multilayered polyester film of the present invention after heat treatment at 150° C. for 30 minutes is preferably 0% or more and 30% or less. By setting the degree of crystallinity of the layer X after heat treatment at 150° C. for 30 minutes within the above range, for example, the multilayered polyester film of the present invention can be used as a release film provided with a release layer, and the layer X can be removed using water even after heat is applied in the step of processing a substance to be released. The C (150) is more preferably 1.0% or more and 20% or less, still more preferably 1.0% or more and 10% or less. When C (150) is less than 1.0%, the stability of the layer X is deteriorated by applying heat, and it may be difficult to use the polyester film of the present invention as a release film.

The layer X of the multilayered polyester film of the present invention is preferably a water-soluble substance. By using a water-soluble substance as the layer X, it is easy to set the contact angle HX (1) to a preferable range. When the layer X is a water-soluble substance, the multilayered film containing the layer X is washed with water, so that the layer X dissolves in water to cause peeling at the interface between the polyester film and the layer X, and it becomes easy to take out only the polyester film.

Examples of the water-soluble substance include a water-soluble polyester-based resin, a polyester urethane-based resin, a polyvinyl alcohol-based resin (hereinafter, may be referred to as polyvinyl alcohol (PVA)), a polyvinyl pyrrolidone-based resin (hereinafter, may be referred to as polyvinylpyrrolidone (PVP)), and a substance mainly composed of starch. The term "water-soluble" as used herein means that when a solid is immersed in water at 50° C. for 10 minutes, an amount of change in mass of the solid caused by elution into water is 15% or more, and the solid forms an aqueous solution. From the viewpoint of affinity with the polyester film, water solubility, heat resistance, durability to organic solvents (hereinafter, sometimes referred to as solvent resistance), and control of the degree of crystallinity, the layer X is preferably a polyvinyl alcohol-based resin having polyvinyl alcohol as a main chain structure. In particular, PVA is preferable because it has few nonpolar moieties and contains many hydrophilic groups, and therefore has high water solubility and solvent resistance.

When a polyvinyl alcohol-based resin is used as the layer X, the polymerization degree is preferably 300 or more and 1,000 or less, more preferably 300 or more and 800 or less, and still more preferably 400 or more and 600 or less. When the polymerization degree is more than 1,000, as a result of lengthening the molecular chain of polyvinyl alcohol, packing for crystallization is likely to occur even in the molecular chain, and the degree of crystallinity may be high. In a case where the polymerization degree is less than 200, when the layer X is provided on a polyester film by coating, the coatability may be deteriorated, so that the layer X is not able to be multilayered, or the coatability may be deteriorated, so that polyvinyl alcohol forming the layer X is unevenly distributed on the film and does not form a layer. As a result, the interaction between molecules may be strengthened, and the degree of crystallinity may be increased.

When the polyvinyl alcohol-based resin is used as the layer X, the saponification degree is preferably 30 or more and 88 or less, and more preferably 60 or more and 80 or less. The polyvinyl alcohol has a hydroxyl group and an acetyl group as side chains, and the higher the saponification degree, the larger the amount of hydroxyl groups having a smaller bulk as functional groups. Therefore, when the saponification degree is high, crystallization by molecular chain packing tends to easily occur. When the saponification degree exceeds 88, the degree of crystallinity tends to increase. In addition, when the saponification degree is less than 30, since there are many acetyl groups, there are cases where the water solubility is lowered and HX (1) is not able to be set to a preferable range, or the resistance to an organic solvent is lowered.

It is also a preferred embodiment to use, as a side chain of the polyvinyl alcohol-based resin used as the layer X, a copolymerized polyvinyl alcohol obtained by copolymerizing a functional group other than a hydroxyl group or an acetyl group. In particular, by introducing hydrophilic and bulky functional groups, for example, a 1,2-ethanediol group, a carboxyl group, a sodium sulfonate group, or the like, it is easy to set both HX (1) and C (0) to be in preferable ranges. The copolymerization amount is 3 mol % or more and 20 mol % or less, and more preferably 5 mol % or more and 10 mol % or less with respect to the entire polyvinyl alcohol resin. If the copolymerization amount exceeds 20 mol %, when the layer X is provided on the polyester film by coating, the coatability may be deteriorated, and multilayering may be difficult. When the copolymerization amount is less than 3 mol %, the effect for setting HX (1) and C (0) within preferable ranges may not be sufficiently obtained.

When the polyvinyl alcohol-based resin is used as the layer X, it is preferable that an acrylic resin or a polyester resin as a binder or a resin having a crosslinking action such as melamine or oxazoline for improving film formability is not added to the layer X. The binder and the resin having a crosslinking action interact with the hydroxyl group of the side chain of the polyvinyl alcohol-based resin, and the degree of crystallinity and the contact angle are not able to be controlled, and thus tend not to have preferable values.

As one aspect of the multilayered polyester film of the present invention, it is possible to provide a multilayered polyester film including a polyester film and a layer Y, wherein water contact angles HY (1))(°) and HY (20))(°) with the layer Y satisfy the following formulas:

$$80 \leq HY(1) \leq 120, 10 \leq |HY(1)-HY(20)| \leq 80$$

HY(1): Contact angle at one second after water has come into contact with layer Y HY(20): Contact angle at 20 seconds after water has come into contact with layer Y By controlling the contact angle with water and having the layer Y in which HY (1) falls within the above range, the surface energy of the layer Y can be reduced, and as a result, a multilayered polyester film having the layer Y can be used as a release film.

In order to set HY (1) to a preferable value, the layer Y preferably has water repellency. When the layer Y is made of a resin, examples of the resin having high water repellency that can be used for the layer Y include a silicone compound having dimethylsiloxane as a main chain structure, a compound having a long chain alkyl group, and a compound having fluorine.

In addition, HY (20) changes as compared to HY (1), and by setting |HY (1)–HY (20)| to be within the above range, the physical properties of the layer Y can be changed using water as a medium. That is, by changing the physical properties with water as a medium to change the adhesiveness between the layer Y and the multilayered polyester film, the layer Y can be easily removed from the multilayered polyester film using water. When |HY (1)–HY (20)| is small and is less than 10°, the change in the physical properties is not sufficient and the removability may be poor. When |HY (1)–HY (20)| exceeds 80°, the physical properties of the layer Y are unstable, and it may be difficult to provide the layer Y on the polyester film. |HY (1)–HY (20)| is preferably 30° or higher and 80° or lower, and more preferably 45° or higher and 80° or lower.

In order to set |HY (1)–HY (20)| of the layer Y to be within the above range, it is also a preferred embodiment to provide the above-described layer X between the polyester film and the layer Y so as to be in contact with the polyester film and the layer Y (that is, in a multilayered polyester film having a layer X having a water contact angle HX (1) of 0° or higher and 60° or lower on at least one surface of the polyester film, the multilayered polyester film has a layer Y on a surface opposite to a surface of the layer X in contact with the polyester film.). When the layer X that easily absorbs water is in contact with the layer Y, the water in contact with the layer Y permeates the layer Y and is absorbed into the layer X. Therefore, the water contact angle in the layer Y also changes, and |HY (1)–HY (20)| can be set to be within a preferable range. The higher the water repellency of the layer Y is and the higher the water permeability of the layer Y is, |HY (1)–HY (20)| can be set to be within a preferable range. Examples of the resin having high water repellency that can be used for the layer Y include a silicone compound having dimethylsiloxane as a main chain structure, a compound having a long chain alkyl group, and a compound having fluorine. Among them, silicone having dimethylsiloxane having high water permeability as a main chain structure can be suitably used.

Since the multilayered polyester film of the present invention has a large contact angle with water of the layer Y and small surface energy, the multilayered polyester film can be suitably used for release applications in which a layer to be released is provided on a surface of the layer Y opposite to a surface in contact with the layer X, and the layer to be released is released from the layer Y. Furthermore, in the multilayered polyester film of the present invention, since the layer X and the layer Y can be removed with water, only the polyester film can be obtained by removing the layer X and the layer Y after releasing the substance to be released. Furthermore, in the multilayered polyester film of the present invention, it is preferable to remove the layer X and the layer Y to obtain a polyester film, and then reuse the obtained polyester film. Examples of the method for reuse include a method in which the obtained polyester film is provided with the layer X and the layer Y again and used as a release film, and a method in which the polyester film is remelted and formed again into a polyester film, but a method in which the obtained polyester film is remelted and formed again into a polyester film is preferable without limiting the application for reuse.

When a silicone compound, particularly a compound containing a dimethylsiloxane bond is used as the layer Y of the multilayered polyester film of the present invention, the component containing the dimethylsiloxane bond is likely to become a foreign substance when mixed with the polyester film and remelted, so that deterioration of the polyester may be accelerated or extrusion forming may not be performed after melting, and thus it is preferable to remove the layer Y in order to remelt and reuse the film of the present invention.

In the multilayered polyester film of the present invention, a ratio Ra/Xt of a surface roughness Ra (nm) of the polyester film on the side where the layer X is provided to a thickness Xt (nm) of the layer X is preferably 0.001 or more and 1.0 or less. When the ratio Ra/Xt exceeds 1.0, the layer X is not able to cover the entire surface of the polyester film, and high protrusions are exposed. Therefore, when the layer Y is further provided on the layer X, water is not absorbed into the layer X through the layer Y as a result of the layer Y being in direct contact with the polyester film, and the removability of the layer X and the layer Y may be poor. If the ratio Ra/Xt is less than 0.001, the polyester film becomes very smooth, resulting in poor affinity with the layer X, and the layer X may not be provided by coating. The ratio Ra/Xt is more preferably 0.05 or more and 0.5 or less.

When the multilayered polyester film of the present invention having the layer X and the layer Y is used as a release film, examples of the substance to be released include an organic adhesive mainly composed of acryl and an inorganic sheet mainly composed of metal or metal oxide. In particular, barium titanate, which is a metal oxide, is indispensable for producing MLCCs, and the amount of release film used in the process of producing barium titanate sheets is increasing. Under such circumstances, in the process of producing the barium titanate sheets, by using the film of the present invention having the layer X and the layer Y, after being used in the process of producing the barium titanate sheets, the layer X and the layer Y can be removed from the multilayered polyester film of the present invention and only the polyester film can be reused, which can contribute to reduction of environmental load.

A method for producing the multilayered polyester film of the present invention will be described below, but the present invention is not limited to the multilayered polyester film obtained by this method.

For the polyester film used in the present invention, a method can be used in which a raw material dried as necessary is heated and melted in an extruder, and extruded onto a cooled cast drum from a die to form a sheet (melt casting method). The sheet is electrostatically brought into close contact with a drum cooled to a surface temperature of 20° C. to 60° C., so that the sheet is cooled and solidified to prepare an unstretched sheet. The cast drum temperature is more preferably 20° C. or higher and 40° C. or lower, still more preferably 20° C. or higher and 30° C. or lower.

Next, the unstretched sheet is biaxially stretched 3.6 times or more in a longitudinal direction (MD) of the film, 3.9 times or more in a width direction (TD) of the film, and 14.0 times or more and 20.0 times or less in an area ratio at a temperature T1n (° C.) satisfying the following formula (i).

The stretch ratio in the film width direction is preferably 4.0 times or more, and more preferably 4.3 times or more and 5.0 times or less. By setting the stretch ratio in the film width direction to 4.0 times or more, when the layer X is applied to the film after uniaxial stretching using an in-line coating method described later, the components constituting the layer X are extended and stretched following the film, so that it is possible to suppress the components constituting the layer X from being regularly arrayed and to set the degree of crystallinity of the layer X to be within a preferable range. When the stretch ratio in the width direction exceeds 5.0 times, the film formability may be deteriorated.

$$Tg(° C.) \leq T1n(° C.) \leq Tg+40(° C.) \quad (i)$$

Tg: Glass transition temperature (° C.) of polyester film

As a stretching method of the film in the longitudinal direction, a method using a speed difference between rolls is suitably used. At this time, it is also a preferred embodiment that the film is stretched in a plurality of sections while being fixed with nip rolls so that the film does not slip.

Next, a biaxially stretched film is subjected to a heat set treatment at a temperature (Th0 (° C.)) satisfying the following formula (ii) for 1 second or more and 30 seconds or less, uniformly slowly cooled, and then cooled to room temperature to obtain a polyester film.

$$Tmf-35(° C.) \leq Th0(° C.) \leq Tmf(° C.) \quad (ii)$$

Tmf: Melting point of film (° C.)

By obtaining a biaxially stretched film under the conditions that satisfy formula (ii), appropriate orientation can be imparted to the film, and the handleability can be improved when the film is used as a release film.

In order to set the surface roughness of the polyester film of the present invention to be within the above range, it is also a preferred embodiment to add particles to the film in addition to the above-described producing method. As the particles to be added, particles having high hardness are preferred, and crosslinked polystyrene particles, diamond particles, zirconia particles, and aluminum oxide particles are suitably used. The particle addition amount is 0.01% or more and 0.7% or less with respect to the weight of the polyester film.

Next, a method for providing the layer X and the layer Y on the polyester film of the present invention will be described below.

When the layer X is formed of a resin that easily absorbs water, a method is preferably used in which the resin that forms the layer X is dissolved in water and coated on the polyester film of the present invention. As a coating method, a general coating method such as gravure coating, Meyer bar coating, air knife coating, or doctor knife coating can be used. In particular, from the viewpoint of controlling the degree of crystallinity of the layer X, an in-line coating method is suitably used in which the resin of the layer X is coated on the surface layer of the polyester film uniaxially stretched in the longitudinal direction, the polyester film is stretched in the width direction, and the layer X is simultaneously formed. The thickness of the layer X is preferably 50 nm or more and 1,000 nm or less. When the thickness is less than 50 nm, the water absorbency of the layer X is not sufficiently exhibited, and the removability may be poor. If the thickness is larger than 1,000 nm, blocking may occur, leading to deterioration of handleability.

Next, a method for providing a layer Y will be described. The layer Y may be provided simultaneously with or separately from the layer X. In the case of providing the two layers at the same time, a method for simultaneously coating the two layers using a die or the like, or a method for coating the two layers using a coating agent in which a component of the layer X and a component of the layer Y are mixed in advance can be exemplified. In order to improve the multilayering accuracy of the layer X and the layer Y, it is preferable to provide the layer X and the layer Y separately. A coating liquid in which the component of the layer Y is dissolved can be coated on the multilayered polyester film including the layer X obtained by the above-described method using a general coating method such as gravure coating, Meyer bar coating, air knife coating, or doctor knife coating. The thickness of the layer Y is preferably 10 nm or more and 1,000 nm or less. When the thickness is 10 nm or less, the function of the layer Y may not be exhibited, and when the thickness is more than 1,000 nm, the water absorbency of the layer X may not be exhibited, and |HY (1)−HY (20)| may not fall within a preferable range.

Next, a method for removing the layer X and the layer Y will be described. Since the layer X has water absorbency, washing with water is a preferred embodiment. For example, it is preferable that the multilayered film containing the polyester film of the present invention is subjected to a step of unwinding the multilayered film, a step of supplying hot water to the surface of the unwound multilayered film and releasing a surface multilayered portion from the multilayered film, and a step of winding the polyester film after releasing. The temperature of the hot water is preferably 50° C. or more and 100° C. or less. If the temperature is lower than 50° C., the washing property may not be sufficiently obtained. If the temperature is higher than 100° C., it exceeds the glass transition temperature of the polyester film, and thereby the film may not be able to be conveyed. The time during which water comes into contact with the surface of the multilayered film is 5 seconds or more, preferably 10 seconds or more, and more preferably 30 seconds or more and 600 seconds or less. Examples of the step of supplying hot water to the surface of the unwound multilayered film include a method for covering the entire multilayered film in a water tank, and a method for injecting heated water against the film under pressure. By supplying water to the layer Y of the multilayered polyester film, water is absorbed into the layer X through the layer Y, and the physical properties of the layer Y can be changed. As a result, the layer Y is easily moved from the multilayered polyester film, and the washing property is improved. The speed at which the film is conveyed is 5 m/min or more, preferably 10 m/min or more, and more preferably 20 m/min or more and 100 m/min or less. When the multilayered film provided with the layer X and the layer Y is conveyed in the step of removing the layer X and the layer Y, it is also important to apply tension to the multilayered film. By applying tension, the surface of the multilayered film is extended, and the mobility of the layer X and the layer Y is improved, so that the washing property can be improved. The tension is 5 N/m or more and 100 N/m or less, more preferably 20 N/m or more and 80 N/m or less, and more preferably 30 N/m or more and 50 N/m or less. When the tension is less than 5 N/m, the surface of the multilayered film is not extended, and the washing property may be poor. When the tension is more than 100 N/m, wrinkles may be formed on the film, and the film may be poor in surface extensibility and washing property.

As described above, in the polyester film of the present invention, after the layer X having water absorbency is provided on at least one side of the polyester film, the layer Y having a release function is provided and used as a release film for a process or another functional multilayered film, and the layer X and the layer Y are washed with water and removed to obtain only the polyester film. Therefore, the obtained polyester film can be reused as it is, or the film can be remelted and then made into chips, used as a recycled raw material for film formation, and reused as a film.

[Evaluation Methods of Properties]

A. Surface Roughness Ra (Nm) of Polyester Film

Three-dimensional surface roughness is measured under the following apparatus and conditions, arithmetic average roughness Ra of the surface roughness is calculated using analysis software, measurement is performed 10 times at different positions, and an average value thereof is taken as Ra (nm).

Apparatus: "Surf-corder ET-4000A" manufactured by Kosaka Laboratory Ltd.
Analysis software: i-Face model TDA31
Stylus tip radius: 0.5 µm
Measurement visual field: X direction: 380 µm pitch: 1 µm
Y direction: 280 µm pitch: 5 µm
Needle pressure: 50 µN
Measurement speed: 0.1 mm/s
Cut-off value: Low region 0.8 mm, high region none
Leveling: All regions
Filter: Gaussian filter (2D)
Magnification: 100,000 times B. Thickness of Each Layer The thickness of each layer of the multilayered film is determined by the following method. A film cross section is cut out with a microtome in a direction parallel to the film width direction. The cross section is observed with a scanning electron microscope at a magnification of 5,000 times, and the thickness of each of the multilayered layers is measured.

C. Intrinsic Viscosity (IV)

The polyester film of the present invention was dissolved in 100 ml of orthochlorophenol (solution concentration C=1.2 g/dl), and the viscosity of the solution at 25° C. was measured with an Ostwald viscometer. The viscosity of the solvent was also measured in the same manner. Using the obtained solution viscosity and solvent viscosity, [η] (dl/g) is calculated according to the following expression (a), and the resulting value is taken as the intrinsic viscosity (IV).

$$\eta sp/C=[\eta]+K[\eta]^2 \cdot C \qquad (a)$$

In the expression, ηsp=(solution viscosity (dl/g)/solvent viscosity (dl/g))−1, and K is the Huggins constant (defined as 0.343).

D. Copolymerization Amount (Mol %) of Layer X

In a $^{13}$CNMR spectrum and a DEPT 135 spectrum, the copolymerization amount (mol %) is determined from the peak area of the carbon signal introduced with the modified group using the following apparatus.

Apparatus: ECZ-600R (manufactured by JEOL RESONANCE Inc.)

Measurement method: Single 13C pulse with inverse gated
1H decoupling
Measurement frequency: 150.9 MHz
Pulse width: 5.25 has
Lock solvent: $D_2O$
Chemical shift criteria: TSP (0 ppm)
Number of integrations: 10,000 times
Measurement temperature: 20° C.
Specimen rotation speed: 15 Hz E. Saponification Degree of Layer X In accordance with the polyvinyl alcohol test method of JIS K 6726 (1994), the amount of acetic acid groups contained in a specimen is quantitatively determined by a titration method using an aqueous sodium hydroxide solution and calculated.

F. Average Degree of Polymerization of Layer X

In accordance with the polyvinyl alcohol test method of JIS K 6726 (1994), a specimen is completely saponified with an aqueous sodium hydroxide solution, then the viscosity at 25° C. is measured using an Ostwald viscometer, and the average degree of polymerization is calculated from the limiting viscosity.

G. Water Contact Angle (°)

Measurement is performed by the following method using a contact angle meter DM 500 manufactured by Kyowa Interface Science Co., Ltd. and attached analysis software FAMAS. Under an atmosphere of 23° C. and 65% RH, assuming that a time when a water droplet comes into contact with the specimen surface is 0 second, a moving image in a water droplet shape is photographed for 20 seconds. Measurement is performed 5 times at different positions, and in a case where the specimen surface with which a water droplet is in contact is the layer X, average values of contact angles obtained from the water droplet shape after 1 second and the water droplet shape after 20 seconds are respectively calculated as HX (1), HX (20), and a water droplet are in contact is with the layer Y, the average values are similarly calculated as HY (1) and HY (20).

H. Degree of Crystallinity (%) of Layer X

The spectrum of the layer X is measured by an ATR method of FT-IR according to the following apparatus and conditions, and is calculated by the method disclosed in Non-Patent Document (J. Applied Spectroscopy, Vol. 79, No. 4, p 521-526 (2012)).

Apparatus: 670 IR (FT-IR manufactured by Varian)
Light source: Globar
Detector: DLatgs (deuterated L-alanine-doped triglycine sulfate)
Resolution: 4 $cm^{-1}$
Number of integrations: 256 times
Measurement method: Attenuated total reflection method
Attachment: Single reflection ATR Measurement attachment (The Seagull TM), Germanium is used as the ATR crystal.
Incident angle: 60° (no polarization).

I. Releasability of Substance to be Released

A polyester adhesive tape (No. 31B manufactured by Nitto Denko Corporation, width 19 mm) is attached to a surface of a substance to be released of the multilayered polyester on which the substance to be released is multilayered, and the strength at 180° release is measured using an adhesion/film releasing analysis device VPA-H 200 manufactured by Kyowa Interface Science Co., Ltd., and converted into a width of 50 mm. When releasing strength is 50 mN/50 mm or less, it is evaluated as A, and when the releasing strength exceeds 50 mN/50 mm, it is evaluated as B.

J. Removability of Layer X and Layer Y

Using the polyester film obtained by removing the layer X and the layer Y, the water contact angle obtained after 1 second is measured according to the above item G., and the determination is made as follows.

A; 65° or higher and lower than 80°
B; 80° or higher and less than 90°, or less than 65°
C; 90° or higher K. Reusability The polyester film from which the layer X and the layer Y have been removed is pulverized, dried at 180° C. for 2 hours, charged into an extruder, melt-extruded at 280° C., and then formed into a sheet on a cast drum cooled to 25° C., and the intrinsic viscosity of the obtained sheet is measured by the method of C. described above. A difference ($\Delta IV$) between an intrinsic viscosity IV (R) and an intrinsic viscosity IV (I) of the polyester film is determined by the following formula (b) and determined as follows.

$$\Delta IV = |IV(R) - IV(I)| \tag{b}$$

A; Difference in intrinsic viscosity is 0.05 or less
B; Difference in intrinsic viscosity is more than 0.05 and less than 0.15
C; Difference in intrinsic viscosity is more than 0.15.

EXAMPLES

Hereinafter, the present invention will be described by way of examples, but the present invention is not necessarily limited to these examples.

[Production of PET-1]

Terephthalic acid and ethylene glycol were polymerized by a known method using antimony trioxide and magnesium acetate tetrahydrate as catalysts to obtain melt-polymerized PET. The obtained melt-polymerized PET had a glass transition temperature of 81° C., a melting point of 255° C., an intrinsic viscosity of 0.65, and a terminal carboxyl group content of 20 eq./t.

[Production of Masterbatch (MB)-A]

99 parts by mass of PET-1 and 10 parts by mass of a 10 mass % water slurry of crosslinked polystyrene particles (styrene-acrylate copolymer) having a particle diameter of 0.1 μm (1 part by mass as crosslinked polystyrene particles) were supplied, and vent holes were maintained at a reduced pressure of 1 kPa or less to remove moisture, thereby obtaining MB containing 1 weight % of crosslinked polystyrene particles. The glass transition temperature was 81° C., a melting point was 255° C., an intrinsic viscosity was 0.61, and a terminal carboxyl group content was 22 eq./t.

[Production of MB-B]

99 parts by mass of PET-1 and 1 part by mass of calcium carbonate particles having a particle diameter of 1.0 μm were supplied, and the vent holes were maintained at a degree of reduced pressure of 1 kPa or less to remove moisture, thereby obtaining MB containing 1 mass % of the particles. The glass transition temperature was 81° C., a melting point was 255° C., an intrinsic viscosity was 0.61, and a terminal carboxyl group content was 22 eq./t.

[Production of PEN]

A transesterification reaction was performed from dimethyl 2,6-naphthalenedicarboxylate and ethylene glycol using manganese acetate as a catalyst. After completion of the transesterification reaction, PEN was obtained by a known method using antimony trioxide as a catalyst. In addition, 5 crystal alumina particles having a particle size of 0.1 μm were added so that the content of the 5 crystal alumina particles was 0.1 mass % during polymerization. The obtained PEN had a glass transition temperature of 124° C., a melting point of 265° C., an intrinsic viscosity of 0.62, and a terminal carboxyl group concentration of 25 eq./t.

[Preparation of Coating Agent A]

100 parts by mass of an addition reaction type silicone resin release agent (trade name LTC 750 A manufactured by Dow Corning Toray Silicone Co., Ltd.), and 2 parts by mass of a platinum catalyst (trade name SRX 212 manufactured by Dow Corning Toray Silicone Co., Ltd.) were adjusted to a solid content of 5 mass % using toluene as a solvent to obtain a coating agent A.

[Preparation of Coating Agent B]

Polyvinyl alcohol "Poval 5-74" (saponification degree of 74, average degree of polymerization of 500) manufactured by Kuraray Co., Ltd. was dissolved in water so as to be 4 mass % to obtain a coating agent B.

[Preparation of Coating Agent C]

Polyvinyl alcohol "Poval LM-25" (saponification degree of 34, average degree of polymerization of 400) manufactured by Kuraray Co., Ltd. was dissolved in water so as to be 4 mass % to obtain a coating agent C.

[Production of Coating Agent D]

A polyvinyl alcohol "AYB8041W" (saponification degree of 88, average degree of polymerization of 300, 3 mol % of copolymerization amount of 1,2-ethanediol) manufactured by Mitsubishi Chemical Corporation was dissolved in water so as to be 4 mass % to obtain a coating agent D.

[Production of Coating Agent E]

A polyvinyl alcohol "OKS-8089" (saponification degree of 88, average degree of polymerization of 450, 6 mol % of copolymerization amount of 1,2-ethanediol) manufactured by Mitsubishi Chemical Corporation was dissolved in water so as to be 4 mass % to obtain a coating agent E.

[Preparation of Coating Agent F]

PVA having a saponification degree of 75, an average degree of polymerization of 500, and a copolymerization amount of 1,2-ethanediol of 6 mol % was prepared with reference to Patent Document Japanese Patent Laid-open Publication No. 2004-285143. The PVA was dissolved in water so as to be 4 mass % to obtain a coating agent F.

[Preparation of Coating Agent G]

Polyvinyl alcohol "ASP-05" (saponification degree of 88, average degree of polymerization of 500, 1 mol % sodium sulfonate copolymerization) manufactured by JAPAN VAM & POVAL CO., LTD. was dissolved in water so as to be 4 mass % to obtain a coating agent G.

[Preparation of Coating Agent H]

Polyvinyl alcohol "GL-05" (saponification degree of 88, average degree of polymerization of 500) manufactured by Mitsubishi Chemical Corporation was dissolved in water so as to be 4 mass % to obtain a coating agent H.

[Preparation of Coating Agent I]

Polyvinyl alcohol "NL-05" (saponification degree of 99, average degree of polymerization of 500) manufactured by Mitsubishi Chemical Corporation was dissolved in water so as to be 4 mass % to obtain a coating agent I.

[Preparation of Coating Agent J]

In GL-05, a binder polymer (Emulsion polymer of methyl methacrylate/ethyl acrylate/acrylonitrile/N-methylolmethacrylamide=45/45/5/5 (molar ratio) (emulsifier: anionic surfactant)) and a crosslinking agent (hexamethoxymelamine crosslinking agent) were adjusted so as to have a solid content blending ratio of 34/24/42, and dispersed in water so that a solid content concentration was 4 mass % to obtain a coating agent J.

[Preparation of Coating Agent K]

Polyvinyl alcohol "3266" (saponification degree of 88, average degree of polymerization of 200, 3 mol % sodium sulfonate copolymerization) manufactured by Mitsubishi Chemical Corporation was dissolved in water so as to be 4 mass % to obtain a coating agent K.

[Production of Coating Agent L]

A polyvinyl alcohol "OKS-1089" (saponification degree of 88, average degree of polymerization of 2500, 3 mol % of copolymerization amount of 1,2-ethanediol) manufactured by Mitsubishi Chemical Corporation was dissolved in water so as to be 4 mass % to obtain a coating agent L.

[Preparation of Coating Agent M]

Polyvinylpyrrolidone "KW-30" (average degree of polymerization of 30,000) manufactured by Nippon Shokubai Co., Ltd. was dissolved in water so as to be 4 mass % to obtain a coating agent L.

[Preparation of Dielectric Paste]

Glass beads having a number average particle size of 2 mm were added to 100 parts by weight of barium titanate (trade name HPBT-1 manufactured by Fuji Titanium Industry Co., Ltd.), 10 parts by mass of polyvinyl butyral (trade name BL-1 manufactured by Sekisui Chemical Co., Ltd.), 5 parts by mass of dibutyl phthalate and 60 parts by mass of toluene-ethanol (mass ratio 30:30), and the mixture was mixed and dispersed for 20 hours by a jet mill, and then filtered to prepare a paste-like dielectric paste.

[Preparation of Pressure-Sensitive Adhesive]

97 parts by mass of butyl acrylate, 3 parts by mass of acrylic acid, 0.2 parts by mass of azobisisobutyronitrile as a polymerization initiator, and 233 parts by mass of ethyl acetate were added, then nitrogen gas was flowed, and nitrogen substitution was performed for about 1 hour while stirring. Thereafter, a flask was heated to 60° C. and reacted for 7 hours to obtain an acrylic polymer having a weight average molecular weight (Mw) of 1.1 million. In this acrylic polymer solution (with a solid content of 100 parts by mass), 0.8 parts by mass of trimethylolpropane tolylene diisocyanate (trade name: "Coronate L", manufactured by Nippon Polyurethane Industry Co., Ltd.) as an isocyanate-based cross-linking agent and 0.1 parts by mass of a silane coupling agent (trade name: "KBM-403", manufactured by Shin-Etsu Chemical Co., Ltd.) were added to prepare a pressure-sensitive adhesive composition containing acryl as a main component.

Example 1

80 parts by mass of PET-1 and 20 parts by mass of MB-A were mixed, vacuum-dried at 160° C. for 2 hours, then charged into an extruder, melted at 280° C., and extruded onto a casting drum having a surface temperature of 25° C. through a die to prepare an unstretched sheet.

Subsequently, the sheet was preheated by a heated roll group, then stretched 3.8 times in the longitudinal direction (MD direction) at a temperature of 90° C., and then cooled by a roll group at a temperature of 25° C. to obtain a uniaxially stretched film. The coating agent B was applied to the obtained uniaxially stretched film by a bar coating method so that the coating thickness after drying was 100 nm, and subsequently the film was stretched 4.3 times in the width direction (TD direction) perpendicular to the longitudinal direction in a heating zone at a temperature of 100° C. in a tenter while both ends of the film were held by clips.

Further, in a heat treatment zone of the tenter, the resulting film was heat-fixed at a temperature of 235° C. for 10 seconds. Then, after uniformly slow cooling in a cooling zone, the film was taken up to obtain a multilayered polyester film in which the layer X was multilayered. The properties of the obtained polyester film and layer X were as shown in Tables 1 and 2.

The coating agent A was applied on the surface of the layer X of the obtained multilayered polyester film opposite to a surface in contact with the polyester film by a gravure coating method so that a thickness of the layer Y was 0.1 μm to obtain a multilayered polyester film. The properties of the layer Y were as shown in Table 3.

The dielectric paste as a substance to be released was applied to the obtained multilayered polyester film by a die coating method so that the thickness after drying was 1.0 μm. Thereafter, the dielectric was released from the obtained multilayered body, and a release film roll for a step in which the substance to be released was released was obtained. The film roll was introduced into a water washing apparatus having an unwinding and winding device, and washed with water at 100° C. for 2 minutes under a tension of 30 N/m to recover the polyester film from which the layer X and the layer Y had been removed.

The water contact angle HX (1) and the degree of crystallinity C (0) of the layer X were in preferable ranges, and the water contact angle of the layer Y was also in preferable ranges. Therefore, the releasability of the substance to be released and the removability of the layer X and the layer Y were excellent, and the film reused according to the item K. had no problem in practical use (Table 3).

Examples 2 to 6

A multilayered polyester film was prepared in the same manner as in Example 1 except for using the coating agent C in Example 2, the coating agent D in Example 3, the coating agent E in Example 4, the coating agent F in Example 5, and the coating agent G in Example 6 as the layer X, and the layer X and the layer Y were removed to reuse the polyester film (Tables 1, 2, and 3).

In Example 2, since the saponification degree was slightly low, the degree of crystallinity C (0) of the layer X was low, but the solvent resistance was slightly low. Therefore, the contact angle HY (1) of the layer Y was slightly small, and the releasability of the substance to be released was slightly deteriorated, but was in a practically acceptable range.

In Examples 3 and 6, since the amount of the copolymerization component was small, the degree of crystallinity C (0) of the layer X was slightly large, but there was no problem in practical use in the releasability of the substance to be released, the removability of the layer X and the layer Y, and the reusability of the polyester film.

In Examples 4 and 5, the degree of crystallinity C (0) C (150) of the layer X was able to be suppressed to a small value, and as a result, excellent removability of the layer X and the layer Y and reusability of the polyester film were exhibited.

Example 7

A multilayered polyester film was prepared in the same manner as in Example 4 except that the polyester raw material used was PEN and the film production conditions were as shown in the table, the layer X and the layer Y were removed, and the polyester film was reused (Tables 1, 2, and 3). The degree of crystallinity C (0) C (150) of the layer X was able to be suppressed to a small value, and as a result, excellent removability of the layer X and the layer Y and reusability of the polyester film were exhibited.

Example 8

A multilayered polyester film was prepared in the same manner as in Example 4 except that the polyester raw materials used were 80 parts by mass of PET-1 and 20 parts by mass of MB-B, and the thickness of the layer X was changed as shown in the table, the layer X and the layer Y were removed, and the polyester film was reused (Tables 4, 5, and 6).

The surface roughness of the polyester film was large, and Ra/Xt was large. As a result, the contact angle HY (20) of the layer Y was slightly large, and the removability of the layer X and the layer Y and the reusability of the polyester film were slightly poor, but were in a practically acceptable range.

Example 9

A multilayered polyester film was prepared in the same manner as in Example 1 except for using the coating agent M as the layer X, the layer X and the layer Y were removed, and the polyester film was reused (Tables 4, 5, and 6). Although the degree of crystallinity C (0) of the layer X was low, polyvinylpyrrolidone had a nonpolar moiety, and therefore had high affinity for an organic solvent and slightly low solvent resistance. Therefore, the contact angle HY (1) of the layer Y was slightly small, and the releasability of the substance to be released was slightly deteriorated, but was in a practically acceptable range.

Example 10

In Example 5, a pressure-sensitive adhesive was used as a substance to be released, and was applied by a die coating method so that the thickness after drying was 10 μm. Thereafter, the pressure-sensitive adhesive was released from the obtained multilayered body, and a release film roll for a step in which the substance to be released was released was obtained. The film roll was introduced into a water washing apparatus having an unwinding and winding device, and washed with water at 100° C. for 2 minutes under a tension of 30 N/m to recover the polyester film from which the layer X and the layer Y had been removed (Tables 4,5, and 6).

The degrees of crystallinity C (0), C (150) of the layer X were able to be suppressed to small values, and as a result, excellent removability of the layer X and the layer Y and reusability of the polyester film were exhibited.

Comparative Examples 1 to 5

A multilayered polyester film was prepared in the same manner as in Example 1 except for using the coating agent H in Comparative Example 1, the coating agent I in Comparative Example 2, the coating agent J in Comparative Example 3, the coating agent K in Comparative Example 4, and the coating agent L in Comparative Example 5 as the layer X, and the layer X and the layer Y were removed to reuse the polyester film (Tables 4, 5, and 6).

In Comparative Example 1 in which PVA constituting the layer X did not have a copolymerization component, HX (1) and the degree of crystallinity C (0) were large, and the contact angle of the layer Y was not in a preferable range, so that removability of the layer X and the layer Y was poor. Thereafter, when the pulverized polyester film was melt-extruded according to the above-described item K., since the layer X and the layer Y were not able to be removed and remained, deterioration occurred in the extruder, and thereby it was not possible to form a sheet.

In Comparative Example 2 in which the saponification degree of PVA constituting the layer X was large, HX (1) and the degree of crystallinity C (0) were large, and the contact angle of the layer Y was not in a preferable range, so that removability of the layer X and the layer Y was poor. Thereafter, when the pulverized polyester film was melt-extruded according to the above-described item K., since the layer X and the layer Y were not able to be removed and remained, deterioration occurred in the extruder, and thereby it was not possible to form a sheet.

In Comparative Example 3 in which the content of PVA was small as a component constituting the layer X and further a resin having a crosslinking action with a binder was contained, HX (1) and the degree of crystallinity C (0) were large, and the contact angle of the layer Y was not in a preferable range, so that removability of the layer X and the layer Y was poor. Thereafter, when the pulverized polyester film was melt-extruded according to the above-described item K., since the layer X and the layer Y were not able to be removed and remained, deterioration occurred in the extruder, and thereby it was not possible to form a sheet.

In Comparative Example 4 in which the average degree of polymerization of PVA constituting the layer X was small, the degree of crystallinity C (0) was large, and the contact angle of the layer Y was not in a preferable range, so that removability of the layer X and the layer Y was poor. Thereafter, when the pulverized polyester film was melt-extruded according to the above-described item K., since the layer X and the layer Y were not able to be removed and remained, deterioration occurred in the extruder, and thereby it was not possible to form a sheet.

In Comparative Example 5 in which the average degree of polymerization of PVA constituting the layer X was large, HX (1) and the degree of crystallinity C (0) were large, and the contact angle of the layer Y was not in a preferable range, so that removability of the layer X and the layer Y was poor. Thereafter, when the pulverized polyester film was melt-extruded according to the above-described item K., since the layer X and the layer Y were not able to be removed and remained, deterioration occurred in the extruder, and thereby it was not possible to form a sheet.

TABLE 1

|  |  |  |  | Example 1 | Example 2 | Example 3 | Example 4 | Example 5 | Example 6 | Example 7 |
|---|---|---|---|---|---|---|---|---|---|---|
| Polyester film | Polyester | | | PET | PET | PET | PET | PET | PET | PEN |
| | IV | | | 0.64 | 0.64 | 0.64 | 0.64 | 0.64 | 0.64 | 0.61 |
| | Production conditions | Longitudinal magnification | Temperature (° C.) | 90 | 90 | 90 | 90 | 90 | 90 | 120 |
| | | | Magnification | 3.8 | 3.8 | 3.8 | 3.8 | 3.8 | 3.8 | 3.8 |
| | | Lateral magnification | Temperature (° C.) | 100 | 100 | 100 | 100 | 100 | 100 | 150 |
| | | | Magnification | 4.3 | 4.3 | 4.3 | 4.3 | 4.3 | 4.3 | 3.8 |
| | | Heat treatment temperature (° C.) | | 235 | 235 | 235 | 235 | 235 | 235 | 235 |
| | Surface roughness Ra (nm) | | | 8 | 8 | 8 | 8 | 8 | 8 | 5 |
| | Thickness (μm) | | | 30 | 30 | 30 | 30 | 30 | 30 | 30 |

TABLE 2

|  |  | Example 1 | Example 2 | Example 3 | Example 4 | Example 5 | Example 6 | Example 7 |
|---|---|---|---|---|---|---|---|---|
| Layer X | Constituent component | PVA | PVA | PVA | PVA | PVA | PVA | PVA |
| | Copolymerization component | — | — | 1,2-ethanediol | 1,2-ethanediol | 1,2-ethanediol | Sodium sulfonate | 1,2-ethanediol |
| | Copolymerization amount (mol %) | — | — | 3 | 6 | 6 | 1 | 6 |
| | Saponification degree | 74 | 34 | 88 | 88 | 75 | 88 | 88 |
| | Average degree of polymerization | 500 | 400 | 300 | 450 | 500 | 500 | 450 |
| | Thickness (Xt) (nm) | 100 | 100 | 100 | 100 | 100 | 100 | 100 |
| | Water contact angle HX (1) (°) | 60 | 60 | 40 | 40 | 35 | 40 | 40 |
| | Water contact angle HX (20) (°) | 30 | 15 | 16 | 16 | 15 | 15 | 16 |
| | \|HX (1)-HX (20)\| | 30 | 45 | 24 | 24 | 20 | 25 | 24 |
| | Degree of crystallinity C (0) (%) | 24 | 0 | 24 | 3 | 1 | 20 | 3 |
| | Degree of crystallinity C (150) (%) | 38 | 0 | 40 | 5 | 1 | 24 | 5 |
| | Ra/Xt | 0.08 | 0.08 | 0.08 | 0.08 | 0.08 | 0.08 | 0.08 |

TABLE 3

|  |  | Example 1 | Example 2 | Example 3 | Example 4 | Example 5 | Example 6 | Example 7 |
|---|---|---|---|---|---|---|---|---|
| Layer Y | Constituent component | Polydimethyl siloxane | Polydimethyl siloxane | Polydimethyl siloxane | Polydimethyl siloxane | Polydimethyl siloxane | Polydimethyl siloxane | Polydimethyl siloxane |
| | Thickness (nm) | 100 | 100 | 100 | 100 | 100 | 100 | 100 |
| | Water contact angle HY (1) (°) | 100 | 80 | 105 | 105 | 105 | 105 | 105 |
| | Water contact angle HY (20) (°) | 33 | 40 | 35 | 28 | 25 | 33 | 28 |
| | \|HY(1)-HY(20)\| | 67 | 40 | 70 | 77 | 80 | 72 | 77 |

TABLE 3-continued

|  |  |  | Example 1 | Example 2 | Example 3 | Example 4 | Example 5 | Example 6 | Example 7 |
|---|---|---|---|---|---|---|---|---|---|
| Release film | Substance to be released |  | Barium titanate | Barium titanate | Barium titanate | Barium titanate | Barium titanate | Barium titanate | Barium titanate |
|  | Releasability of substance to be released | Releasing force (mN/50 mm) | 30 | 58 | 30 | 30 | 30 | 30 | 30 |
|  |  | Determination | A | B | A | A | A | A | A |
|  | Removal of layer X and layer Y | Removal method | Washing with water | Washing with water | Washing with water | Washing with water | Washing with water | Washing with water | Washing with water |
|  |  | Water contact angle (°) after removal | 82 | 70 | 80 | 76 | 70 | 78 | 70 |
|  |  | Determination | B | A | B | A | A | A | A |
|  | Reuse | Reuse method | Melt extrusion | Melt extrusion | Melt extrusion | Melt extrusion | Melt extrusion | Melt extrusion | Melt extrusion |
|  |  | IV(R) | 0.51 | 0.60 | 0.51 | 0.60 | 0.60 | 0.55 | 0.58 |
|  |  | Determination | B | A | B | A | A | B | A |

TABLE 4

|  |  |  |  | Example 8 | Example 9 | Comparative Example 1 | Comparative Example 2 | Comparative Example 3 |
|---|---|---|---|---|---|---|---|---|
| Polyester film | Polyester |  |  | PET | PET | PET | PET | PET |
|  | IV |  |  | 0.64 | 0.64 | 0.65 | 0.65 | 0.65 |
|  | Production conditions | Longitudinal magnification | Temperature (° C.) | 90 | 90 | 90 | 90 | 90 |
|  |  |  | Magnification | 3.8 | 3.8 | 3.8 | 3.8 | 3.8 |
|  |  | Lateral magnification | Temperature (° C.) | 100 | 100 | 100 | 100 | 100 |
|  |  |  | Magnification | 4.3 | 4.3 | 4.3 | 4.3 | 4.3 |
|  |  | Heat treatment temperature (° C.) |  | 235 | 235 | 235 | 235 | 235 |
|  | Surface roughness Ra (nm) |  |  | 43 | 8 | 8 | 8 | 8 |
|  | Thickness (μm) |  |  | 30 | 30 | 30 | 30 | 30 |

|  |  |  |  | Comparative Example 4 | Comparative Example 5 | Example 10 |
|---|---|---|---|---|---|---|
| Polyester film | Polyester |  |  | PET | PET | PET |
|  | IV |  |  | 0.65 | 0.65 | 0.64 |
|  | Production conditions | Longitudinal magnification | Temperature (° C.) | 90 | 90 | 90 |
|  |  |  | Magnification | 3.8 | 3.8 | 3.8 |
|  |  | Lateral magnification | Temperature (° C.) | 100 | 100 | 100 |
|  |  |  | Magnification | 4.3 | 4.3 | 4.3 |
|  |  | Heat treatment temperature (° C.) |  | 235 | 235 | 235 |
|  | Surface roughness Ra (nm) |  |  | 8 | 8 | 8 |
|  | Thickness (μm) |  |  | 30 | 30 | 30 |

TABLE 5

|  |  | Example 8 | Example 9 | Comparative Example 1 | Comparative Example 2 | Comparative Example 3 | Comparative Example 4 | Comparative Example 5 | Example 10 |
|---|---|---|---|---|---|---|---|---|---|
| Layer X | Main constituent components | PVA | PVP | PVA | PVA | PVA/acryl | PVA | PVA | PVA |
|  | Copolymerization component | 1,2-ethanediol | — | — | — | — | Sodium sulfonate | 1,2-ethanediol | 1,2-ethanediol |
|  | Copolymerization amount (mol %) | 6 | — | — | — | — | 3 | 3 | 6 |
|  | Saponification degree | 88 | — | 88 | 99 | 88 | 88 | 88 | 75 |
|  | Average degree of polymerization | 450 | 30000 | 500 | 500 | 500 | 200 | 2500 | 500 |
|  | Thickness (Xt) (nm) | 50 | 100 | 100 | 100 | 100 | 100 | 100 | 100 |
|  | Water contact angle HX (1) (°) | 40 | 55 | 62 | 64 | 62 | 40 | 65 | 35 |
|  | Water contact angle HX (20) (°) | 30 | 23 | 57 | 63 | 58 | 39 | 65 | 15 |
|  | |HY(1)-HY(20)| | 10 | 22 | 5 | 1 | 4 | 1 | 0 | 20 |
|  | Degree of crystallinity C (0) (%) | 3 | 0 | 32 | 33 | 33 | 31 | 38 | 1 |

TABLE 5-continued

|  | Example 8 | Example 9 | Comparative Example 1 | Comparative Example 2 | Comparative Example 3 | Comparative Example 4 | Comparative Example 5 | Example 10 |
|---|---|---|---|---|---|---|---|---|
| Degree of crystallinity C (150) | 5 | 0 | 37 | 45 | 33 | 31 | 44 | 1 |
| Ra/Xt | 0.86 | 0.08 | 0.08 | 0.08 | 0.08 | 0.08 | 0.08 | 0.08 |

TABLE 6

|  |  |  | Example 8 | Example 9 | Comparative Example 1 | Comparative Example 2 | Comparative Example 3 |
|---|---|---|---|---|---|---|---|
| Layer Y | Main constituent components |  | Polydimethyl siloxane | Polydimethyl siloxane | Polydimethyl siloxane | Polydimethyl siloxane | Polydimethyl siloxane |
|  | Thickness (nm) |  | 100 | 100 | 100 | 100 | 100 |
|  | Water contact angle HY (1) (°) |  | 105 | 74 | 105 | 105 | 105 |
|  | Water contact angle HY (20) (°) |  | 85 | 40 | 100 | 100 | 98 |
|  | |HY (1)-HY (20)| |  | 20 | 40 | 5 | 5 | 7 |
| Release film | Substance to be released |  | Barium titanate | Barium titanate | Barium titanate | Barium titanate | Barium titanate |
|  | Releasability of substance to be released | Releasing force (mN/50 mm) | 30 | 61 | 30 | 30 | 30 |
|  |  | Determination | A | B | A | A | A |
|  | Removal of layer X and layer Y | Removal method | Washing with water | Washing with water | Washing with water | Washing with water | Washing with water |
|  |  | Water contact angle (°) after removal | 85 | 70 | 95 | 95 | 95 |
|  |  | Determination | B | A | C | C | C |
|  | Reuse | Reuse method | Melt extrusion | Melt extrusion | Melt extrusion | Melt extrusion | Melt extrusion |
|  |  | IV | 0.53 | 0.60 | — | — | — |
|  |  | Determination | B | A | — | — | — |

|  |  |  | Comparative Example 4 | Comparative Example 5 | Example 10 |
|---|---|---|---|---|---|
| Layer Y | Main constituent components |  | Polydimethyl siloxane | Polydimethyl siloxane | Polydimethyl siloxane |
|  | Thickness (nm) |  | 100 | 100 | 100 |
|  | Water contact angle HY (1) (°) |  | 105 | 105 | 105 |
|  | Water contact angle HY (20) (°) |  | 97 | 100 | 25 |
|  | |HY (1)-HY (20)| |  | 8 | 5 | 80 |
| Release film | Substance to be released |  | Barium titanate | Barium titanate | Pressure-sensitive adhesive |
|  | Releasability of substance to be released | Releasing force (mN/50 mm) | 30 | 30 | 15 |
|  |  | Determination | A | A | A |
|  | Removal of layer X and layer Y | Removal method | Washing with water | Washing with water | Washing with water |
|  |  | Water contact angle (°) after removal | 95 | 95 | 70 |
|  |  | Determination | C | C | A |
|  | Reuse | Reuse method | Melt extrusion | Melt extrusion | Melt extrusion |
|  |  | IV | — | — | 0.60 |
|  |  | Determination | — | — | A |

INDUSTRIAL APPLICABILITY

Since the multilayered polyester film of the present invention has a low degree of crystallinity of the layer X and is excellent in water absorbability, the layer Y multilayered in contact with the layer X is excellent in removability with water. When the layer Y of the present invention is made of a water-repellent material, the layer Y can be suitably used as a release film for a process for producing a multilayer ceramic capacitor (MLCC) including a dielectric paste as a substance to be released. In addition, since the polyester film can be easily recovered from the release film after being used in the MLCC production process, the polyester film can be easily reused as a raw material for melt film formation.

The invention claimed is:

1. A multilayered polyester film which comprises a polyester film and a layer X which is disposed on at least one surface of the polyester film, wherein the polyester film comprises a polyethylene terephthalate or polyethylene-2,6-naphthalenedicarboxylate film, the layer X consists essentially of a polyvinyl alcohol based resin that has a saponification degree of 30 or more and 88 or less, has a polyvinyl alcohol structure as a main chain structure and optionally contains 3 to 20 mol % of a member selected from the group comprising a 1,2-ethanediol group, a carboxyl group and a sodium sulfate group, has a water contact angle HX(1) of 0° or higher and 60° or lower, has a degree of crystallinity C(0) of 0% or more and 30% or less, and has an absolute value of the difference between HX(20) and HX(1)(|HX(20)−HX(1)|) of 5° or higher, wherein HX(1) is the contact angle at one second after water has come into contact with layer X and HX(20) is the contact angle at twenty seconds after water has come into contact with layer X, and the layer X is removable from the polyester film by washing with only water.

2. The multilayered polyester film according to claim 1, wherein the degree of crystallinity C(150) of the layer X after a heat treatment at 150° C. for 30 minutes is 0% or more and 30% or less.

3. The multilayered polyester film according to claim 1, wherein a ratio Ra/Xt of a surface roughness Ra (nm) of the polyester film on a side where the layer X is provided to a thickness Xt (nm) of the layer X is 0.001 or more and 1.0 or less.

4. The multilayered polyester film according to claim 1, further comprising:

a layer Y that consists essentially of a silicone resin having a dimethylsiloxane structure as a main chain structure, has a water contact angle HY(1) of 80° or higher and 120° or lower, and is disposed on a surface of the layer X which is opposite to the layer X surface in contact with the polyester film, wherein the water contact angles HY(1)(°) and HY(20)(°) of the layer Y of the film satisfy the following formula:

$$45 \leq |HY(1)-HY(20)| \leq 80$$

wherein

HY(1) is the contact angle at one second after water has come into contact with layer Y and HY(20) is the contact angle at 20 seconds after water has come into contact with layer Y, and wherein the layer Y is removable from the polyester film by washing with only water.

5. The multilayered polyester film according to claim 4, wherein a layer Z is provided on a surface of the layer Y which is opposite to the layer Y surface in contact with the layer X, the layer Z comprises a ceramic green sheet containing barium titanate as a main component, and the layer Z is removable from the multilayered polyester film.

6. A multilayered polyester film including a polyester film and a layer Y, wherein the polyester film comprises a polyethylene terephthalate or polyethylene-2,6-naphthalenedicarboxylate film, the layer Y consists essentially of a silicone resin having a dimethylsiloxane structure as a main chain structure, water contact angles HY(1)(°) and HY(20)(°) in the layer Y satisfy the following formulas:

$$80 \leq HY(1) \leq 120 \text{ and}$$

$$10 \leq |HY(1)-HY(20)| \leq 80$$

wherein

HY(1) is the contact angle at one second after water has come into contact with layer Y and HY(20) is the contact angle at 20 seconds after water has come into contact with layer Y, and the layer Y is removable from the polyester film by washing with only water.

* * * * *